US006912251B1

(12) United States Patent
Ward et al.

(10) Patent No.: US 6,912,251 B1
(45) Date of Patent: Jun. 28, 2005

(54) FRAME-ACCURATE SEAMLESS SPLICING OF INFORMATION STREAMS

(75) Inventors: Christopher Ward, Glen Ridge, NJ (US); Clifford Pecota, Lebanon, NJ (US); Xiaobing Lee, Monmouth Junction, NJ (US); Gary Hughes, Chelmsford, MA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/347,213

(22) Filed: Jul. 2, 1999

Related U.S. Application Data
(60) Provisional application No. 60/101,696, filed on Sep. 25, 1998, and provisional application No. 60/115,064, filed on Jan. 17, 1999.

(51) Int. Cl.[7] .............................................. H04B 1/66
(52) U.S. Cl. .................. 375/240; 375/240.26; 386/52; 386/111; 348/584; 348/473; 348/432.1
(58) Field of Search .......................... 375/240, 240.04, 375/240.05, 240.26; 348/722, 409, 845, 473, 584, 432; 386/52

(56) References Cited

U.S. PATENT DOCUMENTS

| | | | | |
|---|---|---|---|---|
| 5,534,944 A | * | 7/1996 | Egawa et al. ................ 348/584 |
| 5,732,183 A | * | 3/1998 | Sigiyama ........................ 386/4 |
| 5,793,894 A | * | 8/1998 | Sugiyama ................... 382/236 |
| 5,802,240 A | * | 9/1998 | Asai .............................. 386/52 |
| 5,864,682 A | * | 1/1999 | Porter et al. .................. 348/12 |
| 5,912,709 A | * | 6/1999 | Takahashi ................... 348/416 |
| 5,917,830 A | * | 6/1999 | Chen et al. ................. 370/487 |
| 5,917,988 A | * | 6/1999 | Eto .............................. 386/52 |
| 5,982,436 A | * | 11/1999 | Balakrishnan et al. ...... 348/409 |
| 6,005,621 A | * | 12/1999 | Linzer et al. ............... 348/398 |
| 6,038,000 A | * | 3/2000 | Hurst, Jr. ..................... 348/845 |
| 6,104,441 A | * | 8/2000 | Wee et al. ................... 348/722 |
| 6,137,834 A | * | 10/2000 | Wine et al. ................. 375/240 |
| 6,301,428 B1 | * | 10/2001 | Linzer ................... 375/240.04 |
| 6,330,214 B1 | * | 12/2001 | Ohta et al. ................. 369/47.3 |

OTHER PUBLICATIONS

Hedtke, et al. "Schnittbearbeitung von MPEG–2–codierten Videosequenzen", Fernseh Und Kino Technik, DE 50 (7), Jul. 1996, 367–373 (Translation attached).

Wee, et al., "Splicing MPEG Video Streams in the Compressed Domain" IEEE Workshop on Multimedia Signal Processing, Proceedings of Signal Processing Society Workshop on Multimedia Signal Processing, XX, XX, Jun. 23, 1997, pp. 225–230.

\* cited by examiner

*Primary Examiner*—Chris Kelley
*Assistant Examiner*—Shawn An
(74) *Attorney, Agent, or Firm*—William J. Burke

(57) ABSTRACT

A method and apparatus for effecting a seamless, frame accurate splicing of MPEG-like transport streams by constructing a transition stream or clip with portions from each stream proximate respective splice points.

18 Claims, 9 Drawing Sheets

| | | | (SMPTE TIME CODES) | | |
|---|---|---|---|---|---|
| STREAM A | 00:00:00:00 | $Lt_2$ | 00:00:02:13 | N/A | N/A |
| STREAM B | N/A | N/A | 00:00:00:23 | $>t_2$ | 00:00:04:17 |
| RESULTANT | 00:00:00:00 | $Lt_2$ | 00:00:02:13 | $>t_2$ | 00:00:04:17 |
| | $t_0$ | $t_1$ | $t_2$ | $t_3$ | $t_4$ |

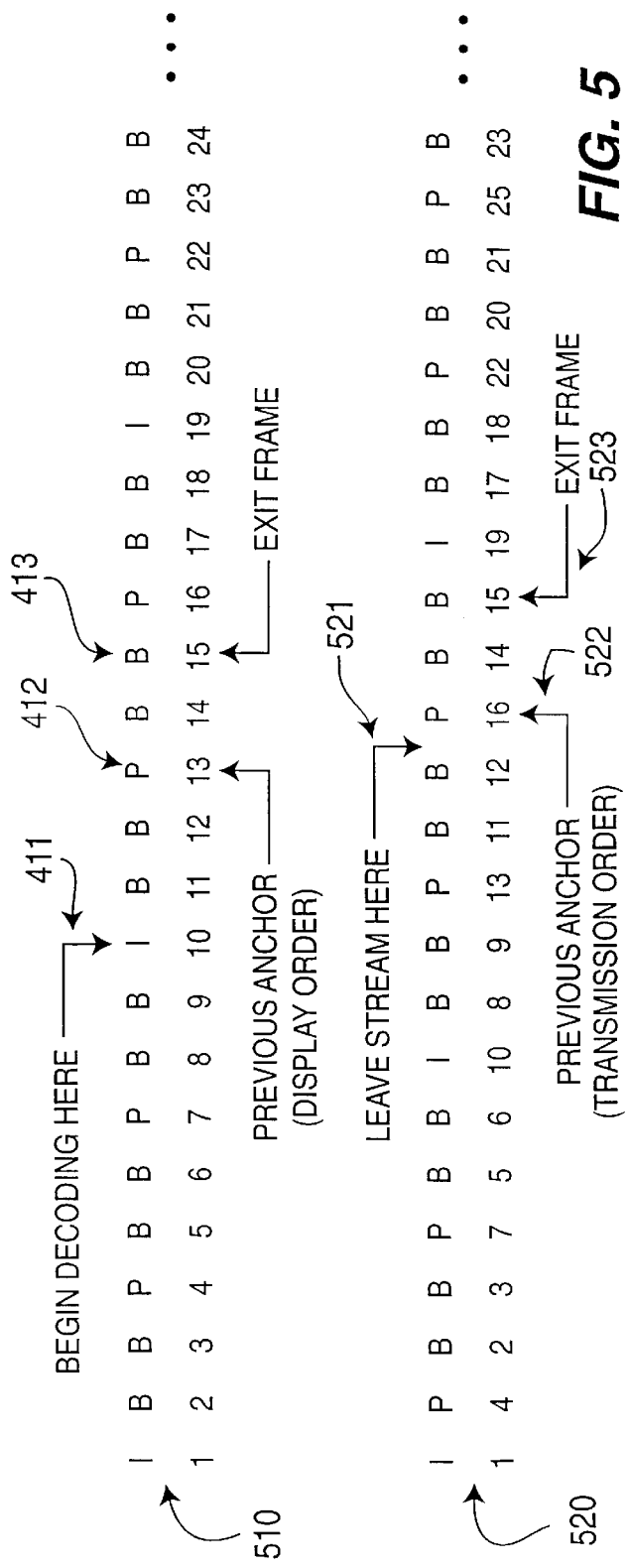

| | | | | | | | | | | | | | | |
|---|---|---|---|---|---|---|---|---|---|---|---|---|---|---|
| 1 | s: | 29 | e: | 878 | fr: | 0I | PT: | 25500 | DT: | 22500 | Bd: 250ms | cBd: 0ms | I | O |
| 2 | s: | 879 | e: | 1213 | fr: | 3P | PT: | 34500 | DT: | 25500 | Bd: 217ms | cBd: 217ms | | |
| 3 | s: | 1214 | e: | 1444 | fr: | 1B | PT: | 28500 | DT: | 0 | Bd: 225ms | cBd: 225ms | | |
| 4 | s: | 1445 | e: | 1770 | fr: | 2B | PT: | 31500 | DT: | 0 | Bd: 240ms | cBd: 240ms | | O |
| 5 | s: | 1771 | e: | 2355 | fr: | 6P | PT: | 43500 | DT: | 34500 | Bd: 248ms | cBd: 248ms | | |
| 6 | s: | 2356 | e: | 2871 | fr: | 4B | PT: | 37500 | DT: | 0 | Bd: 236ms | cBd: 236ms | | |
| 7 | s: | 2872 | e: | 3298 | fr: | 5B | PT: | 40500 | DT: | 0 | Bd: 229ms | cBd: 229ms | | O |
| 8 | s: | 3299 | e: | 3840 | fr: | 9P | PT: | 52500 | DT: | 43500 | Bd: 230ms | cBd: 230ms | | |
| 9 | s: | 3841 | e: | 4225 | fr: | 7B | PT: | 46500 | DT: | 0 | Bd: 221ms | cBd: 221ms | | |
| 10 | s: | 4226 | e: | 4602 | fr: | 8B | PT: | 49500 | DT: | 0 | Bd: 224ms | cBd: 224ms | | O |
| 11 | s: | 4603 | e: | 4942 | fr: | 12P | PT: | 61500 | DT: | 52500 | Bd: 228ms | cBd: 228ms | | |
| 12 | s: | 4943 | e: | 5310 | fr: | 10B | PT: | 55500 | DT: | 0 | Bd: 235ms | cBd: 235ms | | |
| 13 | s: | 5311 | e: | 5678 | fr: | 11B | PT: | 58500 | DT: | 0 | Bd: 240ms | cBd: 240ms | | O |
| 14 | s: | 5679 | e: | 6497 | fr: | 13I | PT: | 64500 | DT: | 61500 | Bd: 245ms | cBd: 245ms | I | O |
| 15 | s: | 6498 | e: | 6685 | fr: | 16P | PT: | 73500 | DT: | 64500 | Bd: 215ms | cBd: 215ms | | |
| 16 | s: | 6686 | e: | 7014 | fr: | 14B | PT: | 67500 | DT: | 0 | Bd: 234ms | cBd: 234ms | | |
| 17 | s: | 7015 | e: | 7365 | fr: | 15B | PT: | 70500 | DT: | 0 | Bd: 241ms | cBd: 241ms | | O |
| 18 | s: | 7366 | e: | 7594 | fr: | 19P | PT: | 82500 | DT: | 73500 | Bd: 248ms | cBd: 248ms | | |
| 19 | s: | 7595 | e: | 8045 | fr: | 17B | PT: | 76500 | DT: | 0 | Bd: 263ms | cBd: 263ms | | |
| 20 | s: | 8046 | e: | 8540 | fr: | 18B | PT: | 79500 | DT: | 0 | Bd: 261ms | cBd: 261ms | | O |
| 21 | s: | 8541 | e: | 8839 | fr: | 22P | PT: | 91500 | DT: | 82500 | Bd: 256ms | cBd: 256ms | | |
| 22 | s: | 8840 | e: | 9347 | fr: | 20B | PT: | 85500 | DT: | 0 | Bd: 267ms | cBd: 267ms | | |
| 23 | s: | 9348 | e: | 9841 | fr: | 21B | PT: | 88500 | DT: | 0 | Bd: 260ms | cBd: 260ms | | O |
| 24 | s: | 9842 | e: | 10213 | fr: | 25P | PT: | 100500 | DT: | 91500 | Bd: 256ms | cBd: 256ms | | |
| 25 | s: | 10214 | e: | 10704 | fr: | 23B | PT: | 94500 | DT: | 0 | Bd: 260ms | cBd: 260ms | | |
| 26 | s: | 10705 | e: | 11196 | fr: | 24B | PT: | 97500 | DT: | 0 | Bd: 255ms | cBd: 255ms | | O |
| 27 | s: | 11197 | e: | 12165 | fr: | 26I | PT: | 103500 | DT: | 100500 | Bd: 250ms | cBd: 250ms | I | O |
| 28 | s: | 12166 | e: | 12536 | fr: | 29P | PT: | 112500 | DT: | 103500 | Bd: 208ms | cBd: 208ms | | |
| 29 | s: | 12537 | e: | 12994 | fr: | 27B | PT: | 106500 | DT: | 0 | Bd: 213ms | cBd: 213ms | | |
| 30 | s: | 12995 | e: | 13408 | fr: | 28B | PT: | 109500 | DT: | 0 | Bd: 211ms | cBd: 211ms | | O |
| 31 | s: | 13409 | e: | 13750 | fr: | 32P | PT: | 121500 | DT: | 112500 | Bd: 212ms | cBd: 212ms | | |
| 32 | s: | 13751 | e: | 14158 | fr: | 30B | PT: | 115500 | DT: | 0 | Bd: 219ms | cBd: 219ms | | |
| 33 | s: | 14159 | e: | 14563 | fr: | 31B | PT: | 118500 | DT: | 0 | Bd: 221ms | cBd: 221ms | | O |
| 34 | s: | 14564 | e: | 14886 | fr: | 35P | PT: | 130500 | DT: | 121500 | Bd: 222ms | cBd: 222ms | | |
| 35 | s: | 14887 | e: | 15290 | fr: | 33B | PT: | 124500 | DT: | 0 | Bd: 231ms | cBd: 231ms | | |
| 36 | s: | 15291 | e: | 15696 | fr: | 34B | PT: | 127500 | DT: | 0 | Bd: 233ms | cBd: 233ms | | O |
| 37 | s: | 15697 | e: | 15999 | fr: | 38P | PT: | 139500 | DT: | 130500 | Bd: 234ms | cBd: 234ms | | |
| 38 | s: | 16000 | e: | 16403 | fr: | 36B | PT: | 133500 | DT: | 0 | Bd: 244ms | cBd: 244ms | | |
| 39 | s: | 16404 | e: | 16802 | fr: | 37B | PT: | 136500 | DT: | 0 | Bd: 246ms | cBd: 246ms | | O |
| 40 | s: | 16803 | e: | 17627 | fr: | 39I | PT: | 142500 | DT: | 139500 | Bd: 249ms | cBd: 249ms | I | O |
| 41 | s: | 17628 | e: | 17916 | fr: | 42P | PT: | 151500 | DT: | 142500 | Bd: 218ms | cBd: 218ms | | |
| 42 | s: | 17917 | e: | 18326 | fr: | 40B | PT: | 145500 | DT: | 0 | Bd: 229ms | cBd: 229ms | | |
| 43 | s: | 18327 | e: | 18743 | fr: | 41B | PT: | 148500 | DT: | 0 | Bd: 230ms | cBd: 230ms | | O |
| 44 | s: | 18744 | e: | 19066 | fr: | 45P | PT: | 160500 | DT: | 151500 | Bd: 231ms | cBd: 231ms | | |
| 45 | s: | 19067 | e: | 19492 | fr: | 43B | PT: | 154500 | DT: | 0 | Bd: 240ms | cBd: 240ms | | |
| 46 | s: | 19493 | e: | 19925 | fr: | 44B | PT: | 157500 | DT: | 0 | Bd: 240ms | cBd: 240ms | | O |
| 47 | s: | 19926 | e: | 20246 | fr: | 48P | PT: | 169500 | DT: | 160500 | Bd: 240ms | cBd: 240ms | | |
| 48 | s: | 20247 | e: | 20683 | fr: | 46B | PT: | 163500 | DT: | 0 | Bd: 248ms | cBd: 248ms | | |
| 49 | s: | 20684 | e: | 21122 | fr: | 47B | PT: | 166500 | DT: | 0 | Bd: 248ms | cBd: 248ms | | O |
| 50 | s: | 21123 | e: | 21454 | fr: | 51P | PT: | 178500 | DT: | 169500 | Bd: 247ms | cBd: 247ms | | |
| 51 | s: | 21455 | e: | 21895 | fr: | 49B | PT: | 172500 | DT: | 0 | Bd: 255ms | cBd: 255ms | | |
| 52 | s: | 21896 | e: | 22373 | fr: | 50B | PT: | 175500 | DT: | 0 | Bd: 254ms | cBd: 254ms | | MO |
| 53 | s: | 22375 | e: | 23078 | fr: | 52I | PT: | 181500 | DT: | 178500 | Bd: 250ms | cBd: 250ms | I | O |
| 54 | s: | 23079 | e: | 23416 | fr: | 55P | PT: | 190500 | DT: | 181500 | Bd: 229ms | cBd: 229ms | | |

FRAME-ACCURATE SEAMLESS SPLICING OF INFORMATION STREAMS

This application claims priority to United States Provisional Patent Application No. 60/101,696, filed Sep. 25, 1998. Additionally, this application claims priority of United States Provisional Patent Application No. 60/115,064, filed Jan. 17, 1999.

This application claims the benefit of the filing date of U.S. application Ser. No. 60/101,696, filed Sep. 25, 1999.

This invention was made with U.S. government support under contract number 70NANB5H1174. The U.S. Government has certain rights in this invention.

The invention relates to communications systems generally and, more particularly, the invention relates to a method for splicing or concatenating information streams in a substantially seamless manner.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG2, refers to ISO/IEC standards 13818 and is incorporated herein by reference. A compressed digital video system is described in the Advanced Television Systems Committee (ATSC) digital television standard document A/53, and is incorporated herein by reference.

It is important to television studios and other "consumers" of information streams to be able to concatenate or splice between information streams (e.g., transport encoded program streams incorporating video, audio and other associated information sub-streams) in a substantially seamless and frame accurate manner. "Frame accurate" means that a splice occurs precisely at the frames selected by the user, regardless of the frame type of the encoded frame (e.g., I-, P- or B-frame encoding). "Seamless splice" means a splice which results in a continuous, valid MPEG stream. Thus, a frame accurate seamless splicer will preserve an exact number of frames when performing a frame accurate seamless splice of a first information stream into a second information stream (e.g., a transport encoded program comprising a 900 video frame commercial presentation may be scheduled into a "slot" of exactly 900 frames).

Several known methods utilize variations of the following procedure: decoding an "in stream" and an "out stream" to a baseband or elementary level, performing a splice operation and re-encoding the resulting spliced stream. These methods provide frame accurate seamless splices, but at great expense.

In an improved method allowing seamless splicing at the transport stream level, MPEG and MPEG-like information streams including, e.g., video information may be spliced together in a relatively seamless manner by defining "In Points" and "Out Points" for each stream that are indicative of, respectively, appropriate stream entry and exit points. For example, a packet containing a video sequence header in an MPEG-like video stream comprises an appropriate In Point. An MPEG-like information stream that contains such In Points and Out Points is said to be spliceable. The Society of Motion Picture and Television Engineers (SMPTE) has proposed a standard SMPTE 312M defining such splicing points entitled "Splice Points for MPEG2 Transport Streams," which is incorporated herein by reference in its entirety.

Unfortunately, the placement of such In points and Out Points is defined by factors such as image frame encoding mode, group of pictures (GOP) structure and the like. Therefore, an end user trying to seamlessly splice between information streams cannot do so in a "frame accurate" manner if the desired splicing points are not appropriate In Points or Out Points.

Therefore, it is seen to be desirable to provide a method and apparatus that allows seamless, frame accurate splicing of MPEG-like transport streams. Moreover, it is seen to be desirable to provide a method and apparatus for applying such a seamless, frame accurate splicing method and apparatus to the particular environment of a television studio or other video serving environment.

SUMMARY OF THE INVENTION

The invention comprises a method and apparatus for effecting a seamless, frame accurate splicing of MPEG-like transport streams by constructing a transition stream or clip with portions from each stream proximate the respective splice points. The transition stream is a data structure comprising a self contained encoded stream including the actual splice point, portions of the "from" stream preceding (in display order) the splice point and portions of the "to" stream subsequent to (in display order) the splice point. The from-stream is exited at an appropriate exit point, at which time the transition stream is entered, and the to-stream is entered at an appropriate entrance point, at which time the transition stream is exited. The transition stream is constructed such that it can be concatenated between the from-stream exit point and the to-stream entrance point without causing non-compliant behavior of, e.g., a decoder buffer.

BRIEF DESCRIPTION OF THE DRAWINGS

The teachings of the present invention can be readily understood by considering the following detailed description in conjunction with the accompanying drawings, in which:

FIG. 4, 5 and 6 depict tabular representations of image frame display order and image frame transmission orders useful in understanding the invention;

FIG. 11 depicts a tabular representation of a meta file suitable for use in the play to air server of FIG. 3.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in any information processing system in which a need exists to perform seamless, frame accurate splicing of, e.g., MPEG-like transport streams including video sub-streams.

An embodiment of the invention will be described within the context of a television studio environment where a play to air controller causes stored video streams (e.g., video segments or "clips") to be retrieved from a server and spliced together in a seamless, frame accurate manner to produce, e.g., an MPEG2 compliant video stream suitable for transporting to a far end decoder. However, since the scope and teachings of the invention have much broader applicability, the invention should not be construed as being limited to the disclosed embodiments. For example, the invention has applicability to server-based asset streaming for cable headends, insertion of local commercials and trailers for digital cinema, frame accurate Internet-based streaming of MPEG2 transport streams and limited production facilities (i.e., those production facilities performing only the composition of segments for news or other applications).

Throughout this description various terms are used to describe the invention. Unless modified by the following description, the several of the terms are defined as follows: A spliced stream comprises a stream formed by concatenating an exit-stream (or from-stream) to an entry-stream (or to-stream) at a particular splicing point. An exit-frame is the last frame of an exit-stream. An entry frame is the first frame of an entry-stream.

Figure 1:
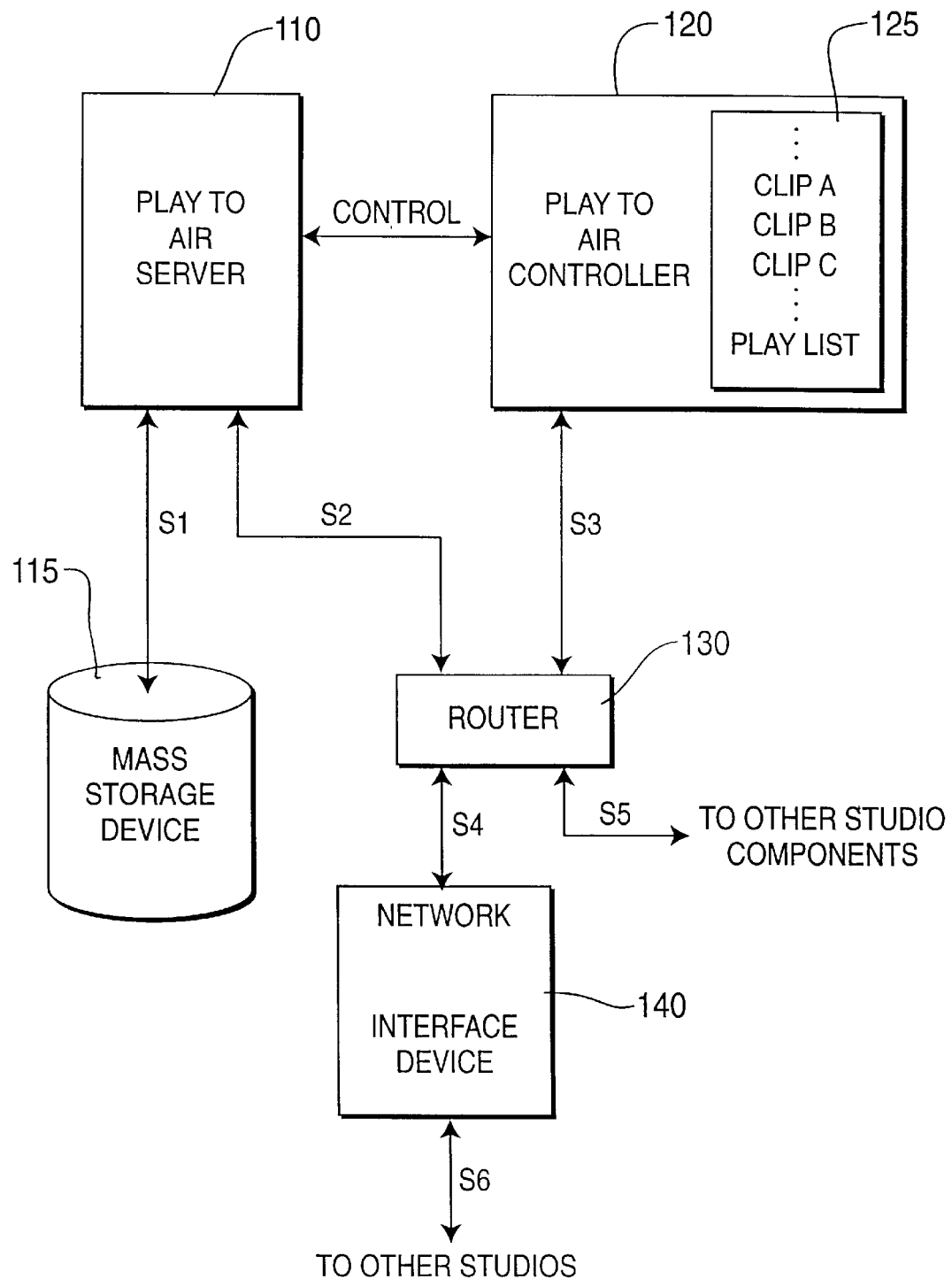
FIG. 1 depicts a high level block diagram of a television studio.

FIG. 1 depicts a high level block diagram of a television studio. Specifically, the studio of FIG. 1 comprises a play to air server 110, a mass storage device 115, a play to air controller 120, a router 130 and a network interface device (NID) 140.

The mass storage device 115 is used to store a plurality of, illustratively, MPEG2 transport streams including encoded video substreams and associated audio streams providing a program. The mass storage device 115 may also be used to store other types of information streams, such as packetized or non-packetized elementary streams comprising video data, audio data, program information and other data.

The play to air server 110 retrieves, via signal path S1, information streams from the mass storage device 115. The retrieved information streams are processed, in response to a control signal produced by the play to air controller 120 (e.g., a play list) to produce an output transport stream comprising a plurality of concatenated transport streams. The play to air server 110 provides the output transport stream and is coupled to the router 130 via signal path S2.

The play to air controller 120 provides control information to the play to air server 110 and other studio equipment (not shown) via a signal path S3, which is coupled to the router 130. The router 130 is used to route all control and program information between the various functional elements of the television studio 100. For example, control information is passed from the play to air controller 120 via signal path S3 to the router 130, which then passes the control information to the play to air server 110 via signal path S2. Optionally, a direct control connection CONTOL between the play to air controller 120 and the play to air server 110 is used for passing control information.

The router 130 receives the output transport stream from the play to air server 110 via signal path S2 and responsively passes output transport stream to other studio components (e.g., editors, off-line storage elements and the like) via signal path S5, or to the network interface device 140 via signal path S6.

The network interface device (NID) 140 is used to communicate the output transport stream, control information or any other information between the television studio 100 of FIG. 1 and other studios (not shown). Optionally, the NID receives information streams from other studios, remote camera crews, broadcasters and the like. These streams are coupled to the play to air server 110 for immediate processing into an output transport stream being produced (e.g., "live" coverage of a news event), for delayed processing or for storage in the mass storage device (with or without processing).

The play to air server 110 and mass storage device 115 may be implemented using a compressed bitstream video server such as the Origin 2000 "Play-To-Air/Production Server" manufactured by SGI of Mountain View, Calif.

The play to air controller 120 comprises a play list 125 corresponding to the information streams or clips that are to be scheduled for subsequent incorporation into the output transport stream of the play to air server 110. The play list 125 includes exact frame entry and exit locations of each of the information streams or clips that are to be retrieved from the mass storage device 115 and concatenated or spliced into the output transport stream by the play to air server. The play list 125 may also identify the first and last frames for each of the information streams or clips.

The play to air server 110, in response to a control signal from the play to air controller providing at least portions of the play list 125, retrieves the appropriate streams or clips from the mass storage device and splices the clips in a seamless, frame accurate manner according to the frame entry and exit information within the control signal to produce the output transport stream. Importantly, the output transport stream produced has no syntax errors or discontinuities to any other studio component, including any remote feeds provided by the Network Interface Devices 140. The splicing or concatenation operations performed by the play to air server will be explained in more detail below with respect to FIG. 2A and FIG. 2B.

Figures 2A, 2B:
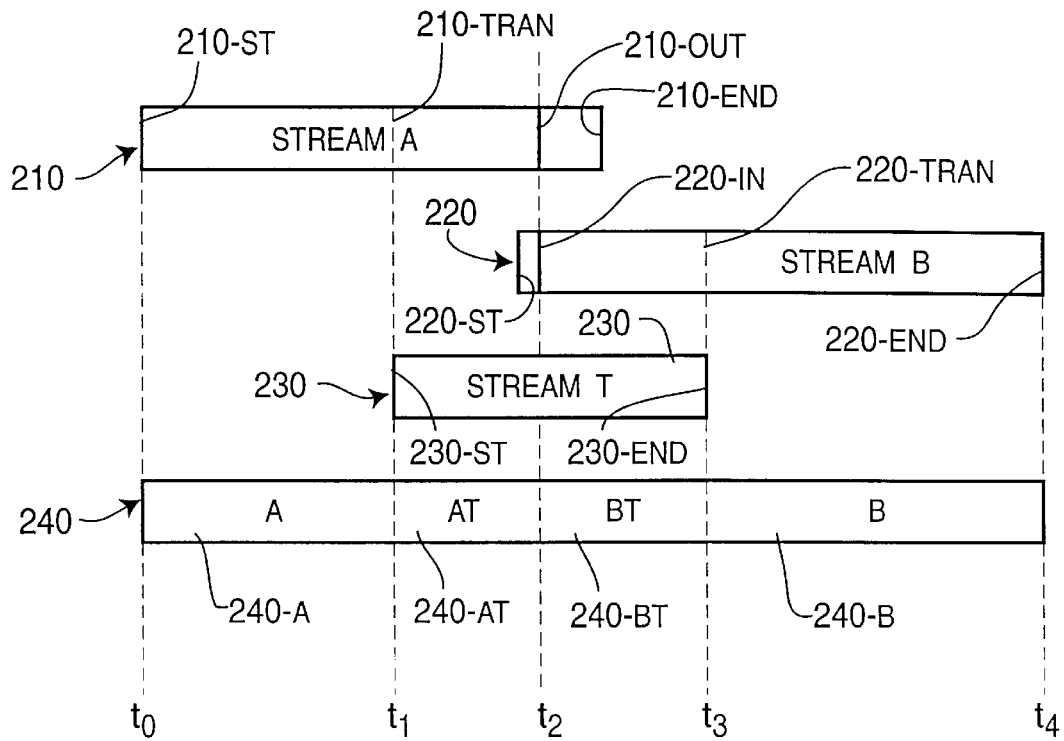
FIG. 2A and FIG. 2B are graphical representations of a splicing operation useful in understanding the invention.

FIG. 2A and FIG. 2B are graphical representations of a splicing operation useful in understanding the invention. Specifically, FIG. 2A graphically depicts a frame accurate, seamless splicing operation of two 30 frames per second MPEG2 transport stream clips (210, 220) using a transition clip (230) to produce a resulting spliced 30 frames per second MPEG2 transport stream clip (240). The transition stream 230 is formed using portions of the first stream 210 and the second stream 220. The resulting spliced stream 240 comprises the concatenation of portions of the first 210, transition 230 and second 220 streams. The resulting spliced stream 240 comprises a "knife edge" or frame accurate splice between the first and second streams at an out-point (210-OUT) of the first stream 210 and an in-point (220-IN) of the second stream 220.

FIG. 2B depicts various SMPTE timecodes associated with the streams or clips depicted in FIG. 2A. The first stream or clip 210 (STREAM A) comprises a plurality of frames including a first frame 210-ST beginning at a time $t_0$, illustratively at a respective SMPTE timecode of 00:00:00:00; a transition out frame 210-TRANS beginning at time $t_1$, an out-frame 210-OUT ending at a time $t_2$, illustratively at a respective SMPTE timecode of 00:00:02:13; and a last frame 210-END starting at a time greater than time $t_2$.

The out-frame 210-OUT comprises the last frame of the first stream 210 to be displayed (i.e., the frame immediately preceding the desired splice point). The out-frame 210-OUT will be included within the transition stream 230. The transition out frame 210-TRANS comprises the last frame of the first stream 210 to be transmitted. That is, the transition stream 230 will be concatenated to the first stream 210 immediately after the transition out frame 210-TRANS.

The second stream or clip 220 (STREAM B) comprises a plurality of frames including a first frame 220-ST beginning at a respective SMPTE timecode of 00:00:00:00; an in-frame 220-IN beginning at time $t_2$, illustratively at a respective SMPTE timecode of 00:00:00:23; a transition in frame 220-TRANS beginning at time $t_3$ and a last frame 210-END ending at a time $t_4$, illustratively a respective SMPTE timecode of 00:00:04:17.

The in-frame 220-IN comprises the first frame of the second stream 220 to be displayed (i.e., the frame immediately following the desired splice point). The in-frame 220-IN will be included within the transition stream 230. The transition in frame 210-TRANS comprises the first frame of the second stream 220 to be transmitted. That is, the transition in frame 220-TRANS will be the first frame of the second stream 210 concatenated to the transition stream 230.

The transition stream or clip 230 (STREAM T) is a data structure well adapted to providing seamless, frame accurate splicing of video streams. The transition stream or clip 230 (STREAM T) comprises a plurality of frames including a first frame 230-ST beginning at a time $t_1$; and a last frame 230-END ending at time $t_3$. The transition clip is comprises frames from both the first stream 210 and the second stream 220, including the respective in- and out-frames. The beginning and end of the transition clip is depicted in FIG. 2 as, respectively, time $t_1$ and $t_3$. It must be noted that these times and the actual first and last frames of the transition stream will be determined according to methods that will be described below with respect to FIGS. 8 and 9.

The resulting spliced stream 240 comprises a plurality of frames including a first frame 240-ST beginning at time $t_0$, illustratively a respective SMPTE timecode of 00:00:00:00; and a last frame 240-END ending at time $t_4$, illustratively a respective SMPTE timecode of 00:00:04:17. The spliced stream 240 comprises 73 frames from the first clip 210 (i.e., $t_0$ through $t_2$) and 115 frames from the second clip 220 (i.e., $t_2$ through $t_4$).

The splice stream 240 depicted in FIG. 2A comprises the first 210 and second 220 streams concatenated in a manner (using the transition stream 230) to effect a knife edge splice (splice stream 240 timecode 00:00:02:13) where the first stream 210 is apparently exited at the out frame 210-OUT and the second stream 220 is apparently entered at in frame 220-IN. Utilizing the present invention, this splicing operation occurs in a frame accurate manner, regardless of the frame type of the out (exit) and in (entry) frames.

It should be noted that under ideal splicing conditions (discussed in the SMPTE 312M splicing standard) it is possible that no transition clip is required. However, under most conditions, the transition clip will contain multiple frames rather than the "empty frame" transition clip that may be generated under the ideal conditions.

Figure 3:
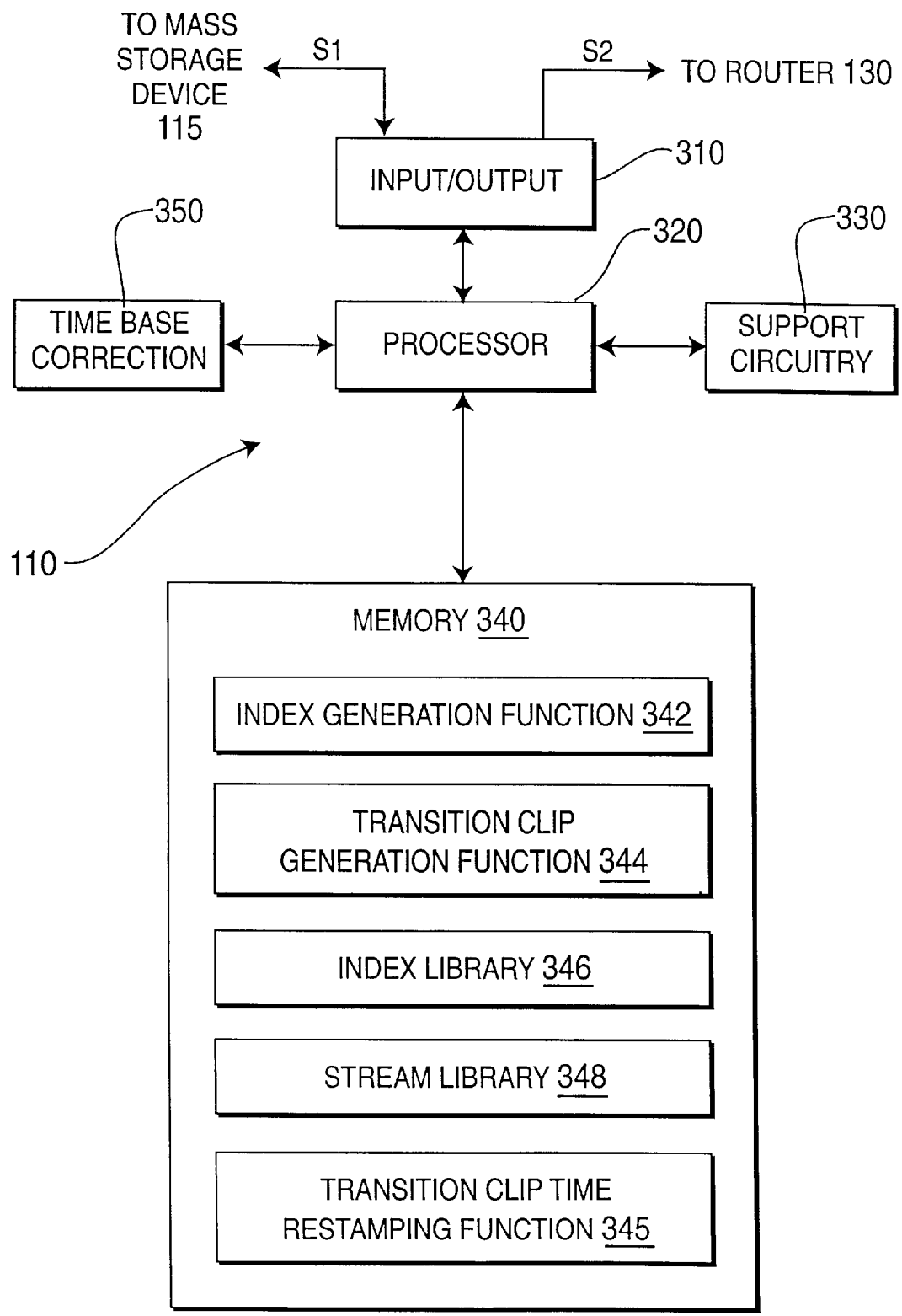
FIG. 3 depicts an embodiment of a play to air server suitable for use in the television studio of FIG. 1

FIG. 3 depicts an embodiment of a play to air server suitable for use in the television studio of FIG. 1. Specifically, the exemplary play to air server 110 of FIG. 3 comprises an input/output (I/O) circuit 310, support circuitry 330, a processor 320, a memory 340 and an optional time base corrector 350. The processor 320 cooperates with conventional support circuitry 310 such as power supplies, clock circuits, cache memory and the like as well as circuits that assist in executing the various software routines within the play to air server 110. The play to air server 110 also includes input/output circuitry 310 that forms an interface between the play to air server 110 and the mass storage device 115 and router 130.

The memory 340 includes programs and other information suitable for implementing the invention. Specifically, the memory 340 is used to store programs that, when executed by the processor 320, perform an index generation function 342, a transition clip generation function 344 and, optionally, a transition clip time restamping function 345. Optionally, the memory 340 includes one or both of an index library 346 and a stream library 348.

To provide a splicing operation such as described above with respect to FIGS. 2A and 2B, the invention utilizes the transition clip generation function 344. The transition clip generation function 344 generates a transition clip, such that it is possible to exit the first stream 210 at a first prescribed Transport Packet boundary (determined by, e.g., the transition stream generator), run the generated transition clip 230, and then enter the second stream 220 at a second prescribed Transport Packet boundary. The actual exit (210-TRANS) and entry (220-TRANS) points to the first 210 and second 220 stream will typically not correspond to the actual frames that were requested. Rather, the transition clip will be constructed using some number of frames immediately before the splice required exit point 210-OUT of the first stream 210, and some number of frames immediately after the splice required entry point 220-IN of the second stream 220.

The invention selects frames to be included in the transition stream in a manner that, preferably, optimizes the quality of the inter-stream transitions. That is, even though a splicing operation is performed in a frame accurate and seamless manner, it is possible for the splicing operation to result in qualitative degradation of video information near the splicing points. This is caused by "bit starving" or other coding anomalies resulting from, e.g., mismatched video buffering verifier (VBV) levels. The invention adapts the VBV levels to minimize such anomalies.

The index generation function 342 will now be described in detail. Two types of information are used to build a transition clip, frame data and MPEG data. Frame data comprises information such as the location, coding type and presentation order of particular frames in the from- and to-streams. Frame data is used to determine which frames within the from-stream and the to-stream are to be recoded to produce the transition clip. MPEG data comprises information such as frame dimensions, bit rate, frame versus field formats, video buffering verifier (VBV) delay, chrominance sampling formats and the like. MPEG data is used to specify the MPEG encoding characteristics of the transport stream. The transition clip is preferably encoded or recoded using the same MPEG parameters as the input TS.

To assist in the generation of transition clip(s) by the transition clip generation function 344, the invention utilizes the index generation function 342. Specifically, the index generation function 342 is used to processes each of the transport streams to be spliced to determine several parameters associated with each frame within the transport streams. The determined parameters are stored in a meta file, such that each transport stream processed by the index generation function 342 has associated with it a meta file. The transport streams processed by the index generation function 342 may be stored in the mass storage device 115 or in the stream library 348. Similarly, the meta file associated with a transport stream may be stored in the mass storage device 115 or in the index library 346.

In the exemplary embodiment, the index generation function 342 determines, for each respective video frame in a transport encoded video stream, the following:

1) the current picture number (in display order);
2) picture coding type (I-, P- or B-frame);
3) the number of the transport packet containing the start of the frame;
4) the number of the transport packet containing the end of the frame;
5) the presentation time stamp (PTS) of the frame;
6) the decode time stamp (DTS) of the frame;
7) the number of the transport packet containing the start of the sequence header preceding the frame;
8) the number of the transport packet containing the start of the picture header preceding the frame; and
9) any indicia of the frame comprising an appropriate in frame or out frame, such as provided by frame markings according to the SMPTE 312M splicing syntax.

In addition to the per-frame data, the index generation function 342 optionally saves all fields for common MPEG2 structures such as sequence headers, picture headers and the like.

Thus, the stream library 348 (or mass storage device 115) comprises transport streams that have been processed according to the index generation function 342. An embodiment of the index generation function 342 will be described below with respect to FIG. 10.

Since parsing a transport stream can be time consuming, one embodiment of the invention utilizes pre-indexing. That is, transport streams stored within the mass storage device 115 or stream library 348 are processed by the index generation function 342 at the time of storage or as soon as possible thereafter. In this manner the time required to build transition clips is greatly reduced since there is no need to parse transport streams at the time of splicing to determine frame and MPEG parameters of the streams. In addition, the play to air server 110 optionally utilizes the meta files stored within the mass storage device 115 or index library 346 to quickly retrieve characteristics of a transport stream that may be needed for scheduling and other functions, such as frame rate.

Figure 10:
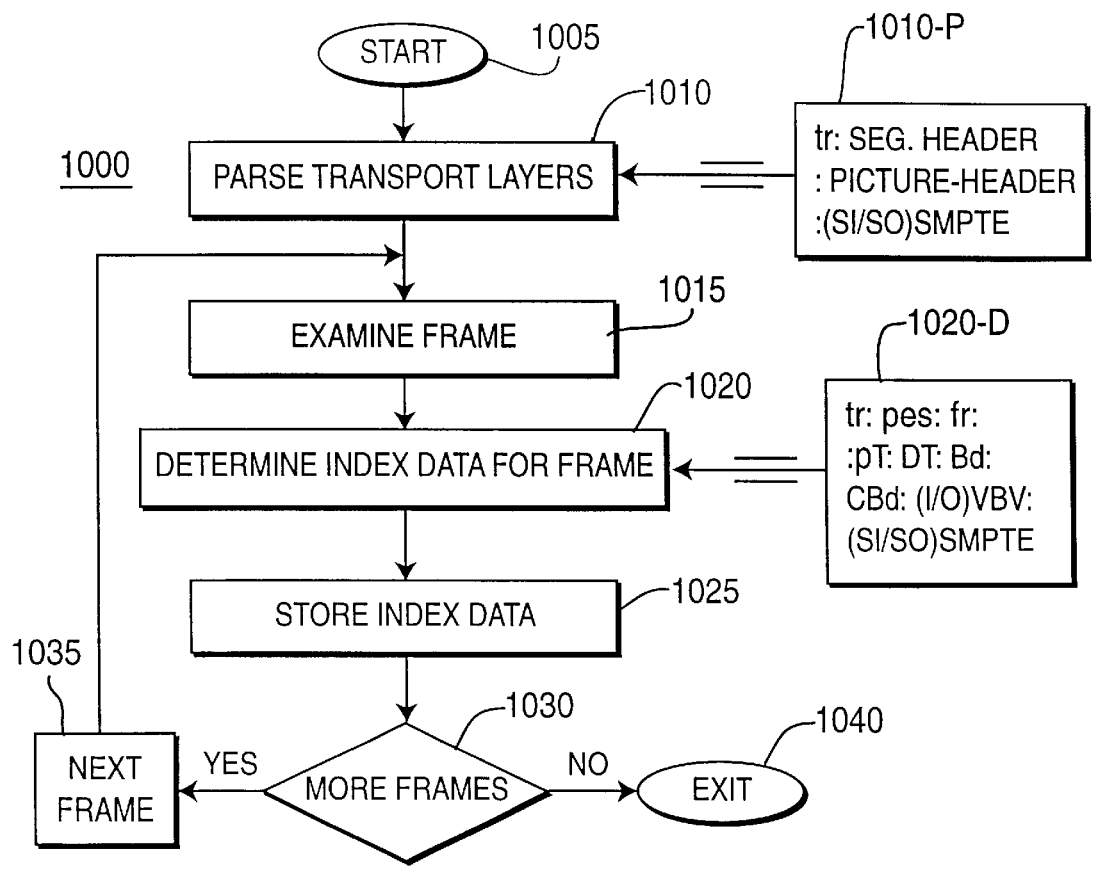
FIG. 10 depicts a flow diagram of a method for indexing an information stream.

FIG. 10 depicts a flow diagram of a method for indexing an information stream. Specifically, FIG. 10 depicts a flow diagram of a method 1000 suitable for use in the index generation function 342 of the play to air server 110 of FIG. 3. The method 1000 of FIG. 10 is suitable for use in implementing step 705 of the method 700 of FIG. 7.

The method 1000 is entered at step 1005, when an information stream to be indexed is received. The method 1000 then proceeds to step 1010.

At step 1010 the transport layer of the information stream to be indexed is parsed. That is, the header portion of each transport packet within the information stream to be parsed is examined to identify a transport packet number (tr), the presence or absence of a sequence header within the transport packet, the presence or absence of a picture header within the transport packet, the presence or absence of a SMPTE 312M splicing syntax indication of a splicing in-frame or a splicing out-frame and other information. The method 1000 then proceeds to step 1015.

At step 1015 the first or present frame is examined. That is, the information stream to be indexed is parsed down to the packetized elementary stream (PES) layer to examine the first video frame of the video elementary stream included within the information stream to be indexed. The method 1000 then proceeds to step 1020.

At step 1020 various parameters associated with the frame examined in step 1015 are determined. Specifically, referring FIG. 1020-D, step 1020 determines the current picture number (in display order), the picture coding type (I-, P- or B- frame), the number of the transport packet containing the start of the frame, the number of the transport packet containing the end of the frame and the presentation times stamp (PTS) and decode time stamp (DTS) of the frame. As previously noted with respect to step 1010, the transport packet containing the start of the sequence header preceding the frame has been noted, the number of the transport packet containing the start of the picture header preceding the frame has been noted and any indicia of the frame comprising an appropriate in-frame or out-frame, such as provided by frame markings according to the SMPTE 312M splicing syntax have been noted. Additionally, at step 1020 the "CBd and Bd" are also determined. The method 1000 then proceeds to step 1025.

The quantity Bd is a buffer delay as marked in the stream. This is the amount of time the first bit of a picture remains in the VBV buffer. The quantity CBd is the calculated buffer delay. The indexer calculates this value as indicated in Annex C of the MPEG2 specification. The buffer delay Bd and calculated buffer CBd should match, but if the input stream is improperly marked the two quantities may differ. The buffer delay value is used by the invention to determine how to adjust the VBV levels between 210trans and 220trans. The VBV level adjustment is done in the transition clip.

At step 1025 the information regarding the index information is stored in, e.g., the mass storage device 115 or the index library 346. The method 1000 then proceeds to step 1030.

At step 1030 a query is made as to whether more frames are to be processed. If the query is answered negatively, then the method 1000 proceeds to step 1040 where it is exited. If the query is answered affirmatively, then the method 1000 proceeds to step 1035 where the next frame is queued, and to step 1015, where the next queued frame is examined.

FIG. 11 depicts a tabular representation of a meta file suitable for use in the index library 346 of FIG. 3. Specifically, the table 1100 of FIG. 11 comprises a plurality of records (1–54), each record being associated with a respective starting transport packet field 1110, packetized elementary stream identification field 1120, frame and frame type identification field 1130, PTS field 1140, DTS field 1150, Bd field 1160, CBd 1170 and marked splice point field 1180.

In one embodiment of the invention, the index generation function 342 is not used prior to receiving and/or splicing transport streams. In this embodiment, frame selection is accomplished using a single-pass processing of at least a portion of each transport stream to be spliced to determine several parameters related to the from-stream and to-stream.

For both the from-stream and the to-stream, the following parameters are determined: transport packet offsets of the sequence_header and picture_header to begin decoding, the number of frames to decode; and the number of decoded frames to discard (e.g., anchor frame needed to decode frames to be included in the transition clip).

For the from-stream only, the following parameters are determined: the last transport packet to play from the from-stream (i.e., the new exit point or exit frame); and the PTS of first frame to display in the transition clip.

For the to-stream only, the following parameters are determined: the starting and ending transport packets for the I-frame to copy to the transition clip; the starting and ending transport packets for remaining GOP to copy to the transition clip; the first transport packet to play from the to-stream (i.e., the new entry point or entry frame); and the number of frames to be copied.

In addition, since the indexing library retrieves MPEG fields as it parses a transport stream, all required recoding parameters are also saved during frame selection.

The transition clip generation function 344 will now be described in detail. The process of constructing a transition clip comprises the steps of 1) determining which frames to include in the transition clip; 2) decoding the frame to be included in the transition clip; 3) encoding or recoding the frames forming the transition clip and 4) transport encoding (i.e., packetizing) the transition clip.

Frame selection affects the size of the output transition clip, the amount of time required to generate the transition and places constraints on the encoder in terms of optimizing the quality of the recoded video. The frame selection method discussed herein resolves the issues of frame dependencies while reducing the frame count and still allowing enough transition time to recode the video without significant loss of quality.

The encoding or recoding step is typically the most time consuming step in the transition clip generation function 344, so reducing the number of frames to recode provides time savings. However, since one of the primary reasons for building a transition clip is to reconcile differences in VBV levels between the two transport streams being spliced. Reducing the frame count makes it more difficult for the encoder to maintain video quality while adjusting the VBV level (especially when decreasing it, since frames must be encoded with fewer bits). To decrease the VBV level, fewer bits must be placed into the buffer than are taken out. This requires the encoder to use fewer bits per picture (on average).

FIG. 4 depicts a tabular representation of image frame display order and image frame transmission order useful in understanding the invention. Specifically, FIG. 4 depicts a first tabular representation 410 depicting the display order of, illustratively, 18 encoded image frames forming a portion of a video sequence and a second tabular representation 420 depicting the transmission order of the 18 image frames forming the video sequence. Per the first tabular representation 410, the image frames are displayed and encoded according to a group of pictures (GOP) structure (i.e., an I-frame followed by a plurality of non-I-frames) as follows (from frame 0 to frame 17, where frames 0–14 form a first GOP, and frames 15–17 are part of the next GOP):

I-B-B-P-B-B-P-B-B-P-B-B-P-B-B-I-B-B.

However, due to the need to receive a frame prior to using the frame in a predictive decoding operation (e.g., since frames 1 and 2 depend on frame 3, frame 3 must be transmitted before frames 1 and 2). Per the second tabular representation 420, the image frames (0–18) are transmitted in the following frame order:

0-3-1-2-6-4-5-9-7-8-12-10-11-15-13-14-18-16-17.

The invention adapts to the mechanics of MPEG encoding and transmission by separately considering the out- or exit-stream and the in- or entrance-stream, as will now be described with respect to FIG. 5.

FIG. 5 depicts a tabular representation of image frame display order and image frame transmission order useful in understanding the invention. Specifically, FIG. 5 depicts a first tabular representation 510 depicting the display order of, illustratively, 24 encoded image frames forming a portion of a video sequence and a second tabular representation 520 depicting the transmission order of the 24 image frames forming the video sequence. For purposes of this discussion, the video sequence depicted in FIG. 5 comprises a portion of a from-stream video sequence (i.e., the first displayed sequence in a spliced sequence), such as described above with respect to the first stream 210 of FIG. 2.

Specifically, per the first tabular representation 510, the image frames are displayed and encoded according to a group of pictures (GOP) structure as follows (from frame 1 to frame 24):

I-B-B-P-B-B-P-B-B-I-B-B-P-B-B-P-B-B-I-B-B-P-B-B.

Additionally, per the second tabular representation 520, the image frames are transmitted in the following frame order:

1-4-2-3-7-5-6-10-8-9-13-11-12-16-14-15-19-17-18-22-20-21-25-23.

It is assumed, for purposes of the following discussion, that it is desired to exit the video sequence depicted in FIG. 5 at frame 15, which comprises a B-frame. That is, frame 15 comprises the out-frame of the exit stream depicted in FIG. 5. As will be discussed below, frames 10 through 15 will be decoded (in display order). It should be noted that frame 16 is the previous anchor frame to frame 15 in transmission order. Therefore, it is necessary to decode frame 16 prior to decoding frames 14 and 15 (which are B-frames). The last frame in the from-clip prior to the transition clip will be frame 13. That is, the from-clip will be exited immediately before frame 16.

Figure 6:
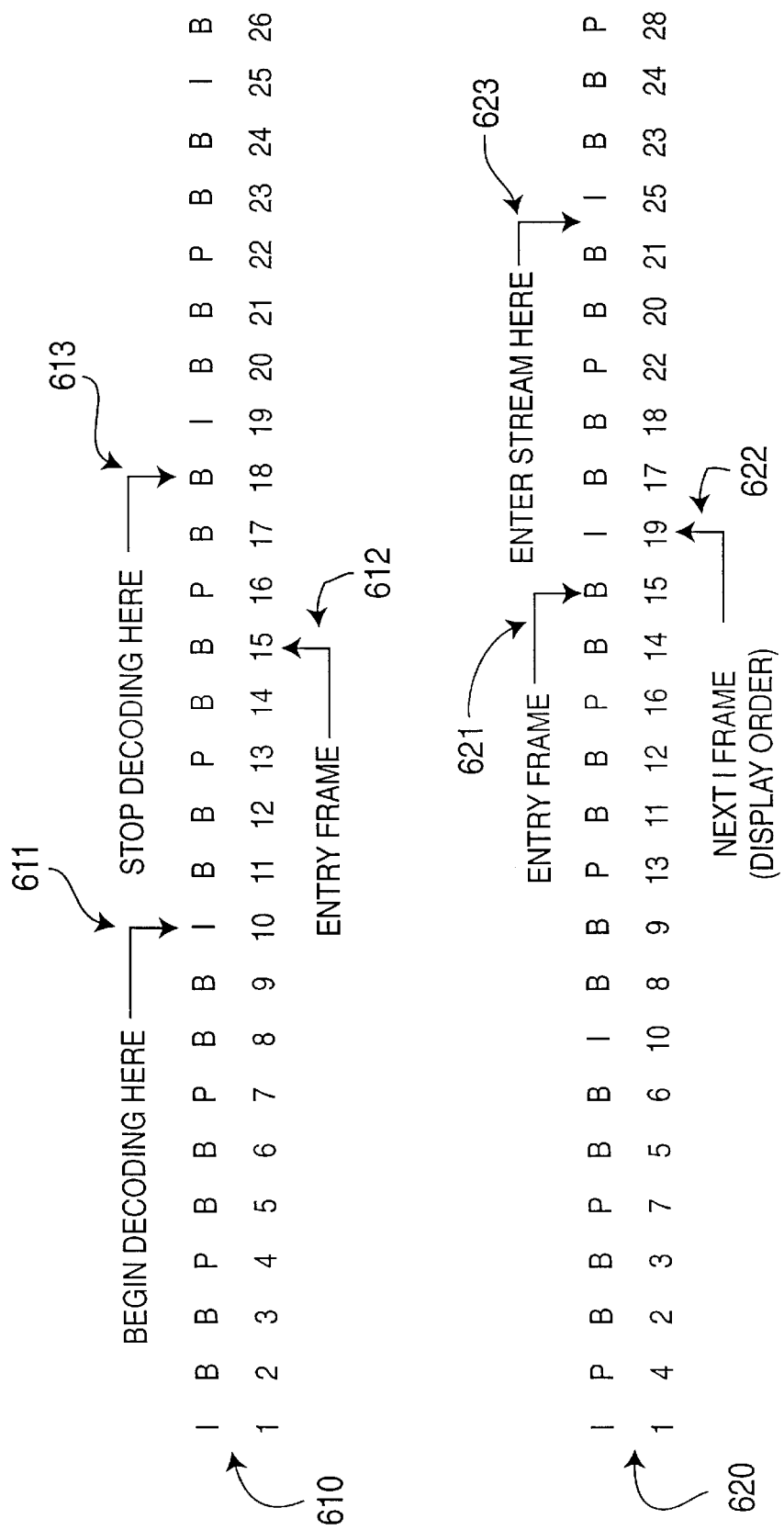

FIG. 6 depicts a tabular representation of image frame display order and image frame transmission order useful in understanding the invention.

Specifically, FIG. 6 depicts a first tabular representation 610 depicting the display order of, illustratively, 26 encoded image frames forming a portion of a video sequence and a second tabular representation 620 depicting the transmission order of the 26 image frames forming the video sequence. For purposes of this discussion, the video sequence depicted in FIG. 6 comprises a portion of a to-stream video sequence (i.e., the second displayed sequence in a spliced sequence), such as described above with respect to the second stream 220 of FIG. 2.

Specifically, per the first tabular representation 610, the image frames are displayed and encoded according to a group of pictures (GOP) structure as follows (from frame 1 to frame 26):

I-B-B-P-B-B-P-B-B-I-B-B-P-B-B-P-B-B-I-B-B-P-B-B-I-B.

Additionally, per the second tabular representation 520, the image frames are transmitted in the following frame order:

1-4-2-3-7-5-6-10-8-9-13-11-12-16-14-15-19-17-18-22-20-21-25-23-24-28.

It is assumed, for purposes of the following discussion, that it is desired to enter the video sequence depicted in FIG. 6 at frame 15, which comprises a B-frame. That is, frame 15 comprises the in-frame of the entry stream depicted in FIG. 6. As will be discussed below, frames 10 through 18 will be decoded (in display order). It should be noted that the first frame to be displayed from the to-stream is frame 25 (an I-frame that is not included in the transition clip).

Figure 7:
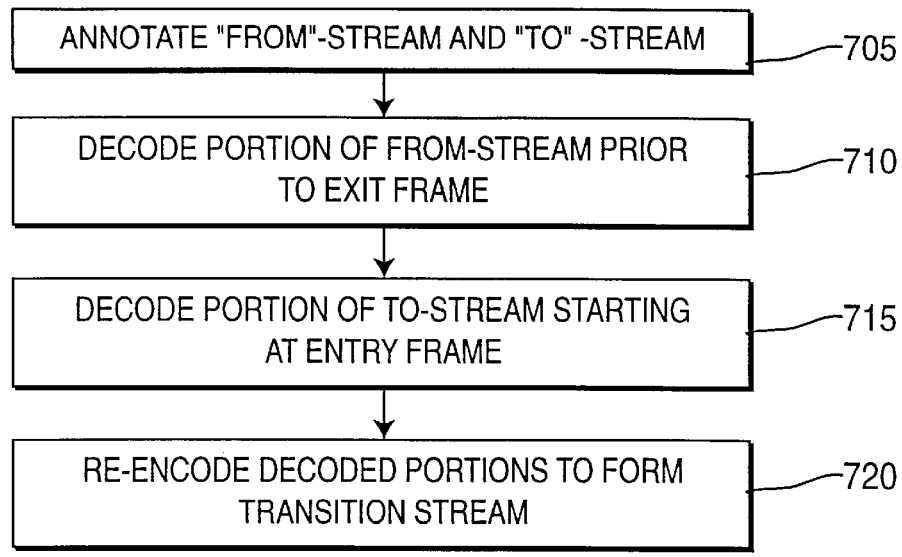
FIG. 7 depicts a flow diagram of a method for generating a transition stream or transition clip.

FIG. 7 depicts a flow diagram of a method for generating a transition stream or transition clip. Specifically, FIG. 7 depicts a flow diagram of a method 700 suitable for use in the transition clip generation function 344 of the play to air server 110 of FIG. 3.

The method 700 is entered at step 705, where a "from-stream" and "to-stream" are annotated. That is, the information stream providing the information prior to a splice point (the from-stream) and the information stream providing information subsequent to the splice point (the to-stream) are annotated to identify, on a frame-by-frame basis various frame parameters as described above with respect to the index generation function 342. A method for annotating an information stream is described above with respect to FIG. 10. The method 700 then proceeds to step 710.

At step 710 a portion of the from-stream prior to the exit frame is decoded. That is, a plurality of information frames within the from-stream, including the exit frame (i.e., the last information frame within the from stream to be displayed) are decoded. The method 700 then proceeds to step 715.

At step 715 a portion of the to-stream starting at the entry frame is decoded. That is, information frames within the to-stream beginning with the entry frame (i.e., the first frame of the to-stream to be displayed) are decoded. The method 700 then proceeds to 750.

At step 720 the decoded portions of the from-stream and to-stream are re-encoded to produce a transition clip or transition stream. A transport stream including, e.g., video and audio information associated with the from-stream and to-stream.

The transition stream or transition clip generated by the method 700 of FIG. 7 is used as a transition between the from-stream and the to-stream by, e.g., the play to air server 110 of FIGS. 1 and 3.

A. Frame Selection.

The first step in the process of constructing a transition clip or transition stream comprises the step of determining which frames to include in the transition clip (i.e., the frame selection process).

Figure 8:
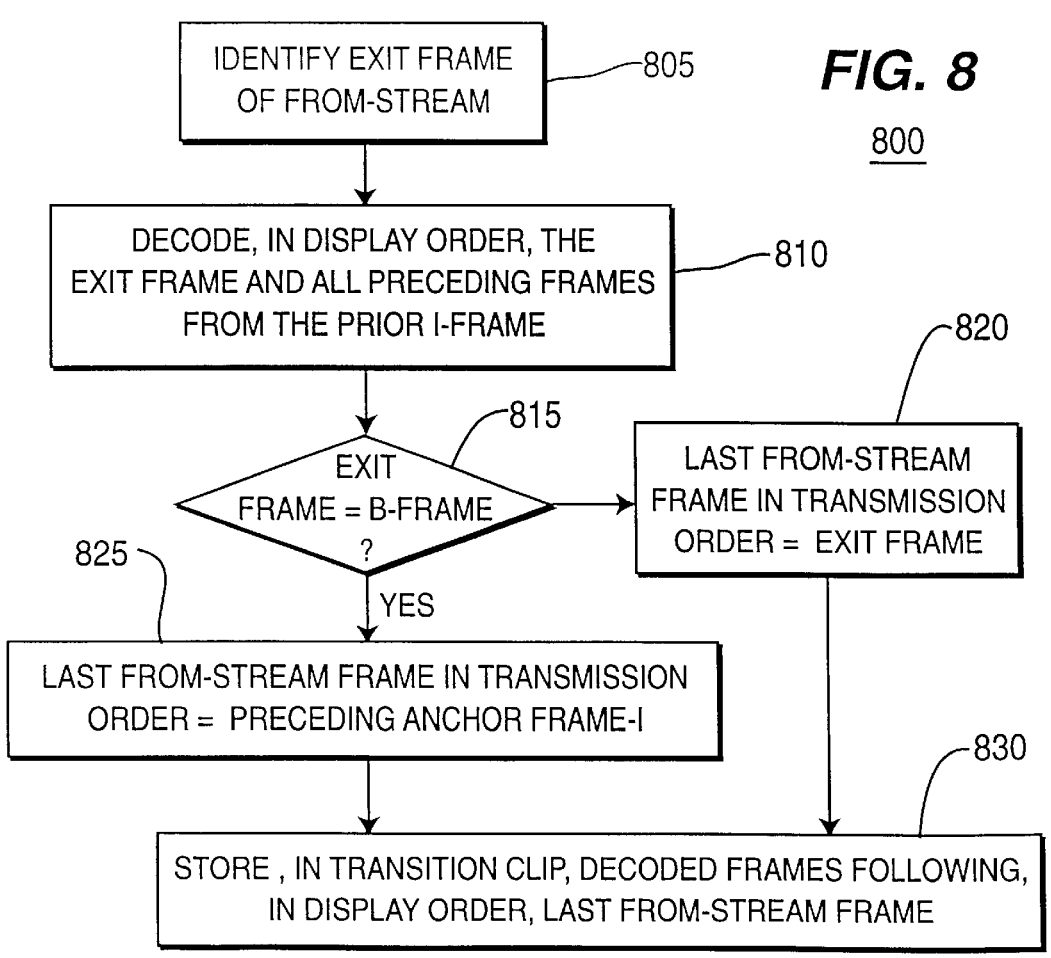
FIG. 8 depicts a flow diagram of a method of determining which information frames within a from-stream should be included within the transition stream.

FIG. 8 depicts a flow diagram of a method of determining which information frames within a from-stream should be included within the transition stream. The method 800 of FIG. 8 is suitable for use in implementing step 710 of the method 700 of FIG. 7.

The method 800 is entered at step 805, where the exit frame of the from-stream is identified. The exit frame of the from-stream is the last frame within the from-stream to be displayed prior to a splice point. For example, referring now to the from-stream depicted in FIG. 5, the exit frame (frame 15) comprises a B-frame denoted as frame 513. The method 800 then proceeds to step 810.

At step 810 the method 800 decodes, in display order, the exit frame and the immediately preceding non-anchor frames. That is, referring again to FIG. 5, the exit frame (frame 15) and the immediately preceding non-anchor frames (frames 11, 12, 13 and 14) are decoded. Since frames 11, 12 and 13 are predicted using frame 10, it is necessary to also decode frame 10. However, the decoded frame 10 may be discarded after frames 11–13 have been decoded. That is, all frames from the I-frame preceding the exit frame in display order up to and including the exit frame are decoded. It is necessary to start from the I-frame because the I-frame has no frame dependencies (i.e., it can be decoded without first decoding any other frames). The method 800 then proceeds to step 815.

At step 815 a query is made as to whether the exit frame is a B-frame. If the query at step 815 is answered negatively, then the method proceeds to step 820. If the query at step 815 is answered affirmatively, then the method 800 proceeds to step 825.

At step 820, since the exit frame is either an I-frame a P-frame, the last from-stream frame to be displayed (i.e., the transition frame) prior to the transition stream frames is the frame immediately preceding, in transmission order, the exit frame. That is, if frame 15 of the from-stream depicted in FIG. 5 was a P-frame or I-frame rather than B-frame, then the last from-stream frame to be displayed would be frame 14. If the exit frame is an I- or P-frame, frame dependencies and reordering make it possible to leave the transport immediately before the next anchor frame (i.e., after all B-frames that are dependent on the exit frame). While this reduces the number of frames to recode, it also reduces the opportunity to adjust VBV levels for the transition. The method 800 then proceeds to step 830.

At step 825 if the exit frame is a B-frame (such as the exit frame in the from-stream depicted in FIG. 5), then the last from-stream frame to be displayed is the frame immediately preceding, in transmission order, the preceding anchor frame. Referring now to FIG. 5, the preceding anchor frame with respect to the exit frame is a P-frame (frame 13). It should be noted that the last frame to be transmitted of the 24 frame sequence depicted in FIG. 5 is the B-frame 12, while the last frame to be displayed is the P-frame 13. The method 800 then proceeds to step 830. At step 830 the decoded frames following, in display order, the last from-stream frame (e.g., the B-frame denoted as frame 12 in FIG. 5) are stored in the transition clip. It should be noted that the transition stream or clip will also include frames from the to-stream. All of the frames that are stored within the transition clip will then be re-encoded to form an encoded transition clip or transition stream.

Figure 9:
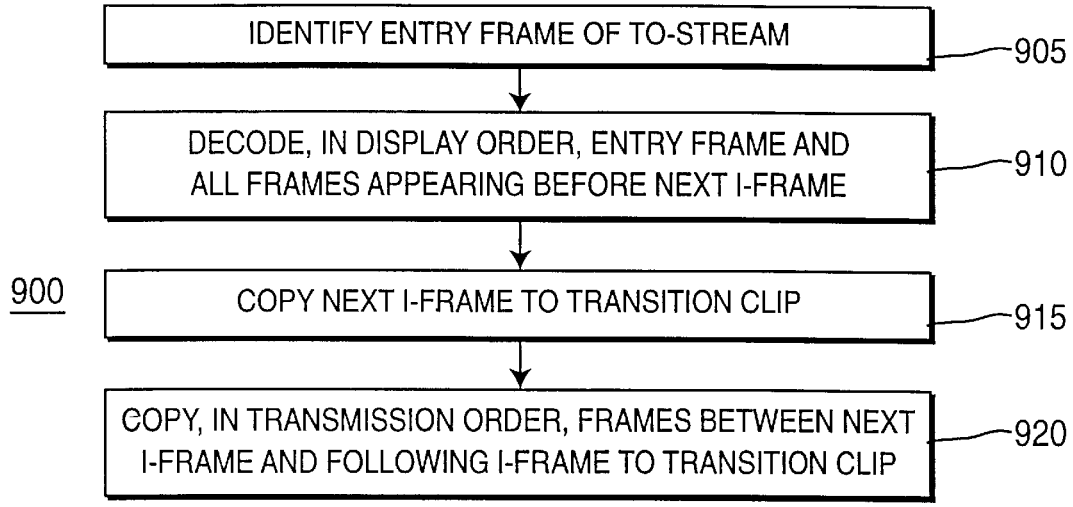
FIG. 9 depicts a flow diagram of a method for determining which information frames within a to-stream should be included within the transition stream.

FIG. 9 depicts a flow diagram of a method for determining which information frames within a to-stream should be included within the transition stream. Specifically, the method 900 of FIG. 9 is suitable for use in implementing step 715 of the transition stream generation method 700 of FIG. 7.

The method 900 is entered at step 905, where the entry frame of the to-stream is identified. The entry frame of the to-stream is the first frame within the to-stream to be displayed after a splice point. For example, referring now to the to-stream depicted in FIG. 6, the entry frame (frame 15) comprises a B-frame. The method 900 then proceeds to step 910.

At step 910 the entry frame and all frames appearing before the next I-frame, in display order, are decoded. That is, referring to FIG. 6, the entry frame (frame 15) and all frames (i.e., frames 16, 17 and 18) appearing before the next I-frame (frame 19) are decoded. Since frames 17 and 18 in the to-stream video sequence depicted in FIG. 6 are predicted using information from the next I-frame (frame 19), it is necessary to also decode the next I-10 frame. However, the decoded frame 19 may be discarded after frames 17 and 18 have been decoded. The method 900 then proceeds to step 915.

At step 915 the next I-frame (e.g., frame 19 of video sequence 610) is copied to the transition clip. That is, the video information within the transport packets forming the to-stream (i.e., the video elementary stream information) are extracted from the transport packets and copied to the transition clip. It is noted that the output of the encoder is a video elementary stream (VES) such that the output from the encoder may be copied directly to the transition clip. The transition clip will be subsequently packetized. The method 900 then proceeds to step 920.

At step 920 the frames (e.g., frames 20 through 22) between the next I-frame (e.g., frame 25) and the following I-frame (frame 19) are also copied, in transmission order, to the transition clip. It must be noted that the frames copied to the transition clip in steps 915 and 920 (e.g., frames 19–21) are copied to the transition clip as encoded frames. Thus, the method 900 adds to the transition clip decoder frames comprising the entry frame and all frames appearing before the next I-frame, and encoded frames comprising the next I-frame and all frames between the next I-frame and the following I-frame.

The method 800 of FIG. 8 and the method 900 of FIG. 9 provide respective from-stream and to-stream video portions for use in a transition clip. Specifically, referring now to FIGS. 5 and 6, the transition clip includes from-stream frames (in transmission order) 16, 14, 15, and to-stream frames (in transmission order) 15, 19, 17, 18, 22, 20 and 21. It should be noted that frames 17, 18, 22, 20 and 21 have only been copied to the transition clip.

The from-stream and to-stream frame selection methods described above with respect to FIGS. 8 and 9 allow for frame dependencies between the transition stream frames and those in one or both of the from-stream and to-stream. The following constraints should be observed. The transition clip is encoded as a closed GOP structure. That is, the transition clip is a self-contained video clip. The transport stream being exited will not reference any frames in the transition clip. If the transport stream being entered is coded using an open GOP structure, then it may contain frames that reference frames in the transition clip.

An important aspect of the invention is the processing of the transition clip to appropriately address frame dependencies of frames that are included within the transition clip. A frame dependency comprises, e.g., a predicted frame within the transition clip (i.e., a P-frame or B-frame) that must be decoded using an anchor frame from outside of the transition clip. While it is desirable to create a transition clip in which there are no external frame dependencies (i.e., a "self contained" clip), the invention is capable of producing an MPEG compliant transition clip including such frame dependencies.

Referring now to FIG. 5, the exemplary 24 frame video sequence 510, 520 comprises an exit-stream or out-stream having an exit frame 15 that is a B-frame. Thus, the transition clip includes, in display order, frames 15 through 18 of the exit-stream. It must be noted that the GOP structure immediately following the recoded frames in the transition clip has been modified. Specifically, referring now to FIG. 6, the exemplary 26 frame video sequence 610, 620 comprises an entrance-stream or in-stream having an entry-frame 15 that is a B-frame. Moreover, in the exit-stream 610, 620, the GOP at frame 119 begins with the sequence I19, B17, B18, P22, B20.

However, in the transition stream frames 17 and 18 have been moved and recoded, so the new GOP begins I19, P22, B20, B21. Therefore, frames 17 and 18 of the entrance-stream are recoded in order to break the frame dependencies when entering the entrance-stream. However, since this results in GOP restructuring, the temporal reference fields of the first GOP after the recoded frames must be restamped. The frames are copied to the transition clip so they can be restamped without affecting the original copy of clip B.

B. Decoding.

The second step in the process of constructing a transition clip or transition stream comprises the step of decoding the frames selected in the frame selection process. The decoding of the selected frames may be effected using standard hardware or software decoding techniques.

In one embodiment of the invention a special purpose decoder is utilized to perform the decoding process. Specifically, the inventors modified a decoder to operate within the transition builder framework as follows. First, the decoder was only capable of decoding video elementary streams (VES). The decoder was modified to decode video from transport streams.

Second, a layer of wrappers was added to provide separate initialization, single frame decoding and shut-down. The new initialization method allows the modified decoder to begin decoding at any I-frame in a transport stream by providing transport packet offsets of the nearest sequence header and the actual location at which to begin decoding. Single frame decoding is useful since, in many circumstances, several frames are discarded. Thus, the modified decoder is capable of discarding frames to be decoded and removed from the decoder output stream prior to decoding the desired frames.

Third, since the modified decoder is utilized twice (once for each transport stream being spliced) within the context of building a single transition clip, it was deemed useful to ensure proper shut-down of the decoder after its first use.

Finally, in an effort to reduce file system overhead and code complexity, the output of the modified decoder output was adapted to save all decoded frames in a single YUV formatted file. It should be noted that typical MPEG tools store each frame in either a separate file or split the Y, U and V components into individual files. Thus, the modified decoder is ideally suited to a video splicing operation.

It should be noted that, regardless of which frames are to be decoded, decoding must begin at an I frame. As an artifact of the use of prediction in MPEG encoding, every non-I frame is ultimately dependent on the previous I frame. The above-described frame selection methods break these dependencies in order to enable frame accurate, seamless splicing between transport streams.

C. Encoding.

The third step in the process of constructing a transition clip or transition stream comprises the step of encoding the decoded frames resulting from the frame selection and decoding processes. The encoding of the selected frames may be effected using standard hardware or software decoding techniques.

In addition to breaking frame dependencies (as noted above), one of the primary objectives when generating a transition clip is to adjust the VBV levels between the from-stream and to-stream such that a far-end decoder processing the resulting spliced transport stream will not suffer overflow, underflow or other undesirable decoder buffer memory behavior. For example, if the VBV level at the exit point of the from-stream is lower than the VBV level at the entry point of the to-stream, then underflow may result downstream from the splice. In typical decoders this will result in "freeze frames" while the decoder waits for data to become available. A much more serious problem occurs when the VBV level at the exit point of the from-stream is higher than the VBV level of the entry point of the to-stream. This may result in a VBV overflow downstream from the splice. An overflow occurs when more data is available than can be buffered. Overflows result in lost and/or corrupted data and typically cause visual artifacts in the decoded pictures and can even cause a decoder to reset.

After the selected frames have been decoded to baseband, they are recoded into a VES. The inventors used a Sarnoff Corporation DTV/MPEG-2 Software Encoder to ensure high overall performance, picture quality and modularity. The rate control algorithm in the encoder was modified to allow specification of initial and ending VBV levels, while the input module of the encoder was updated to support the output file format of the decoder. The MPEG encoding parameters that were parsed from the transport stream during frame selection are passed to the encoder to ensure that the recoded video is compatible with the clips being spliced.

With respect to rate control (which ultimately determines overall picture quality of the recoded portion of the transition clip), when adjusting the VBV level upwards, the selected frames are coded using fewer bits than the original streams. While increasing the VBV level may result in some loss of quality in the resulting output, due to masking in the human visual system, a small degradation in video quality at a scene change is often imperceptible to a viewer. The inventors have determined that such visual degradation imparted to a stream including a frame accurate, seamless splice does not result in a perceptible level of video degradation.

In one embodiment of the invention, the from-stream and to-stream each comprise transport streams having respective video buffering verifier (VBV). The invention determines if a difference exists between the from-stream VBV and the to-stream VBV and responsively adapts the re-encoding process to such a difference, as necessary. For example, the invention may adapt the re-encoding process by increasing a rate control bit allocation in response to a determination that the from-stream VBV exceeds the to-stream VBV by a first threshold level, and by decreasing the rate control bit allocation in response to a determination that the to-stream VBV exceeds the from-stream VBV by a second threshold level.

D. Packetizing.

The fourth step in the process of constructing a transition clip or transition stream comprises the step of encoding the decoded frames resulting from the frame selection and decoding processes After recoding the selected frames, the I-frame and remaining GOP that were copied from the to-stream are appended to the recoded VES. Pending restamping of temporal-reference fields, the resulting transition clip comprises a syntactically complete MPEG2 stream (except that is does not have a sequence_end_code) and contains all frames in the transition. The final step is to packetize the VES into a transport stream.

The first step in packetizing the transition stream is to parse the transition stream to locate the offsets of the start of each frame (either a sequence_header or a picture_header) and the types of frames within the transition stream. Once this data is available, the dependencies between frames are calculated and the frame display order is determined. It should be noted that the temporal_reference fields are unsuitable for this purpose since they are presently invalid due to GOP restructuring. Once the display order has been determined, the temporal reference fields are re-stamped and the presentation (PTS) and decode (DTS) time stamps are calculated for each frame in the transition stream.

It should be noted that according to the MPEG2 standard, temporal discontinuities within a transport stream are allowed. However, since some decoders are not entirely compliant with the MPEG2 standard, such allowed temporal discontinuities within a transport stream result in improper decoder operation. Thus, it is desirable to remove such temporal discontinuities within a transport stream by the use of the re-stamping process.

Using the output of the restamping process, PES headers are generated and the frames are output into a PES stream. The location of each PES header and the size of each PES packet are recorded during this process. Finally, transport packets are generated to hold the PES packets. Each layer of packets adds overhead to the TS resulting in a slight size increase. The packets in the resulting TS are stamped with the PID of the video stream being spliced. The final output of the packetizing process is a TS containing a single VES. The stream does not contain any program specific information (PSI).

E. Remultiplexing.

The final step in the process of constructing a transition clip or transition stream comprises the step of remultiplexing the video clip (now a transport stream) with program specific information (PSI) from the original program stream.

To accomplish the remultiplexing step, the from-stream is examined to extract (as transport packets) a single instance of the program association table (PAT) and the program map table (PMT). In the case of splicing single program transport streams there will only be one PMT. In the case of splicing multiple program transport streams there will be multiple PMTs.

Optionally, to fully implement the ATSC broadcast format, it is necessary to extract other tables as well (as known to those skilled in the art).

After extracting the PAT and the PMT(s), the number of packets in the transition clip is calculated based on the multiplex bit rate, the number of frames in the transition clip and the frame rate. For example, the ATSC specification requires a PAT at least every 100 ms and a PMT at least every 400 ms. The number of packets between PAT and PMT tables is determined from the multiplex bit rate.

After calculating the number of packets in the transition clip, a blank transition clip composed of null transport packets is created and the PAT and PMT tables are inserted at the calculated spacings (e.g., PAT every 100 mS and PMT every 400 mS).

After appropriately inserting the PAT and PMT(s) in the blank transition stream, the video transport stream is inserted into the blank transition stream by spacing packets within the remaining available packets, thereby forming an output transport stream.

It should be noted that when inserting the PAT, PMT and video packets into the empty transition clip, each packet should be restamped with a new continuity_counter. The starting value of the continuity-counter is determined separately for each PID from the exit-stream or from-stream. If the video clip is too large, then there won't be enough transport packets in the transition clip, since the size of the transition clip is calculated with respect to the expected clip duration. This calculation takes into account the frame count, frame rate, VBV delays, multiplex bit rate etc. It is important that VBV adjustment is performed properly by the encoder.

The completed transition clip is then inserted between the spliced transport streams at the calculated transport packet offsets, thereby executing a seamless splice. It should be noted that other multiplexity methods may be used.

It is noted that a seamless splice of a video stream within a transport stream may require some sacrifice of quality with respect to an audio stream within the transport stream. To minimize degradation to audio quality, the transition clip generation function 344 optionally removes broken audio packets, such that the resulting spliced transport stream does not include spurious audio information. Such removal is useful, since audio packets and video packets are typically synchronized by presentation time stamp information, and not by physical location within a transport stream. Thus, when splicing a stream it is possible for audio information to be lost. One remedy to this problem is described in U.S. patent application Ser. No. 08/864,322, filed on May 28, 1997 and incorporated herein by reference in its entirety.

In the case of the transition clip builder some accommodation is made to ensure that the broken audio packets are removed and that the audio transition is clean but this is the limit of the audio processing in the present implementation.

The invention has been primarily described within the context of splicing or concatenating two single program transport streams, i.e., transport streams containing a single audio-visual program, such as a movie, television show or commercial. However, those skilled in the art will appreciate that the invention provides frame accurate, seamless splicing between multi-program transport streams as well. To effect such a splice, the above-described methods are adapted to determine out-frames, in-frames and other appropriate parameters for each program within the multi-program transport streams.

The above-described invention advantageously provides for seamless, frame accurate splicing or concatenation of transport streams using transition streams of clips, thereby avoiding the construction of an entirely new transport stream. The from-and to-streams are not modified during the process, since they are only used to provide information sufficient to produce the transition stream. The transition stream, after being used to effect a change between streams; may be discarded by the system or saved for future use.

There are several timing considerations to be noted. Specifically, the use of the transition clip to effect a splice results in a timing discontinuity within the resulting (spliced) transport stream. Thus, in one embodiment of the invention, the transition clip time restamping function 345 is used to restamp the PCRs (and, optionally, PTSs and DTSs) within the spliced information stream as it is "streamed" or otherwise communicated to a communications network or end user. For example the transition clip time restamping function 345 examines each reference packet (i.e., packets including a PCR) of the out-stream as it is being communicated to the end user. After the splice to the transition stream, the PCR values used for streaming the out-stream are continued to be used in the transition stream. Similarly, after the splice from the transition stream to the to-stream, the PCR values used for streaming the out-stream and transition stream are continued to be used in the to-stream.

In one embodiment of the invention, the various functions described above are packaged into software modules that are controllable from, e.g., the play to air controller 120. Specifically, a Transition Clip Builder module (a tcbuild module) is used to permit an operator to explicitly schedule segments within the playlist 125 and automatically invoke tcbuild to generate transition clips between upcoming segments. There is actually no requirement to generate transition clips for all segments in the playlist since the time taken to generate these clips is "near real-time". That is, generation of a transition clip typically takes about less than a few minutes (this process can be improved by assuming that clips have been indexed previously using a separate software module (a tcindexer module) although this time is platform dependent. The transition clips are then inserted into the playlist, but hidden from the operator. Movements of segments within the playlist cause appropriate modifications to the transition clips.

Figure 12:
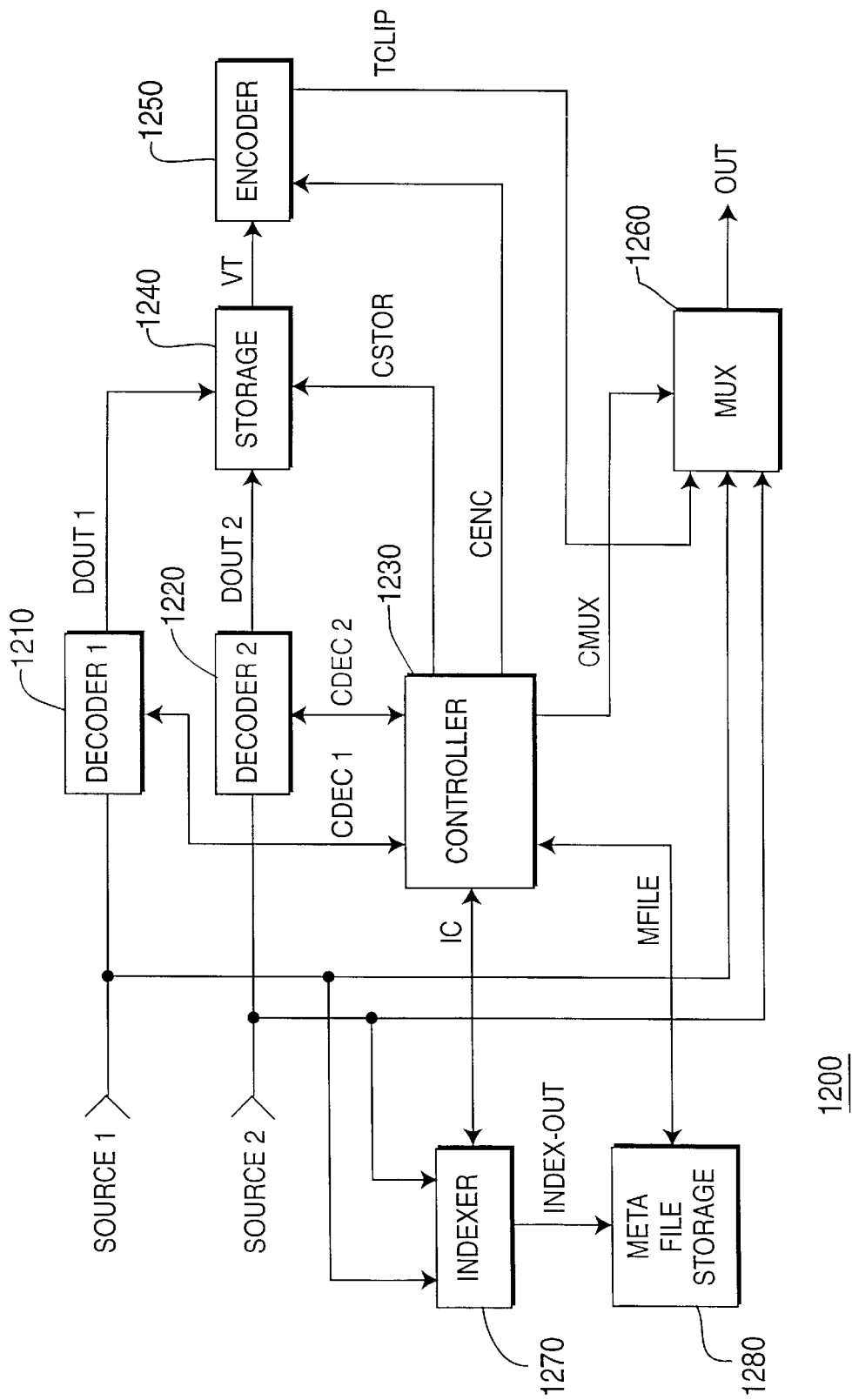
FIG. 12 depicts an apparatus suitable for use in a television studio or other environment where the splicing of video bearing transport streams is useful.

FIG. 12 depicts an apparatus suitable for use in a television studio or other environment where the splicing of video bearing transport streams is useful. Specifically, the system 1200 of FIG. 12 comprises a first decoder 1210, a second decoder 1220, a controller 1230, a storage module 1240, an encoder 1250, a multiplexer 1260 an indexer 1270 and a meta file storage module 1280.

The first decoder 1210, illustratively an MPEG2 video decoder, receives a first video bearing transport stream SOURCE1 and, in response to a control signal CDEC1 provided by the controller 1230, decodes at least a portion of the first video bearing transport stream SOURCE1 to produce a first decoded output stream DOUT1. The first decoded output stream DOUT1 is coupled to the storage element 1240.

The second decoder 1210, illustratively an MPEG2 video decoder, receives a second video bearing transport stream SOURCE2 and, in response to a control signal CDEC2 provided by the controller 1230, decodes at least a portion of the second video bearing transport stream SOURCE2 to produce a second decoded output stream DOUT2. The second decoded output stream DOUT2 is coupled to the storage element 1240.

The storage module 1240 (e.g., a buffer memory, hard disk array or other memory suitable for temporarily storing video elementary streams), in response to a control signal CSTOR provided by the controller 1230, stores some or all of the first and second decoded output streams DOUT1, DOUT2. Further, the storage module 1240 responsively provides a transition stream or transition clip representative video stream VT.

The encoder 1250, in response to a control signal CENC provided by the controller 1230, encodes the transition stream or transition clip representative video stream VT to produce a video bearing transport stream TCLIP. The video bearing transport stream TCLIP, which comprises a transition stream or clip, is coupled to the multiplexer 1260.

In addition to the video bearing transport stream TCLIP provided by the encoder 1250, the multiplexer 1260 also receives the first and second video bearing transport streams SOURCE1 and SOURCE2. The multiplexer 1260, in response to a control signal CMUX provided by the controller 1230, provides an output transport stream OUT comprising a concatenation of two or more of the video bearing transport streams SOURCE1, SOURCE2 and TCLIP.

The first and second video bearing streams SOURCE1 and SOURCE2 are each coupled to the indexer 1270. The indexer 1270, in response to a control signal IC produced by the controller 1230, processes the two video bearing transport streams (according to the indexing method previously described) to produce respective meta files. The meta files are coupled to the meta file storage module 1280 via signal path INDEX_OUT. That is, each of the video bearing streams SOURCE1 and SOURCE2 are coupled, either sequentially or, optionally, concurrently to the indexer 1270 where they are processed to produce respective metafiles, as previously described with respect to FIG. 11. These metafiles are used by the controller 1230 (accessed via signal path MFILE) in determining the appropriate splicing parameters in the manner previously described with respect to FIGS. 1–11.

With the teaching of the above disclosure, it will now be apparent to one skilled in the art that one or more frame delineated or segmented information streams may be included as a sub-streams within a relatively higher bitrate, frame delineated or segmented information stream. In this manner, high bitrate communications systems and protocols, such as the above-described Serial Data Transport Interface (SDTI) standard SMPTE 259 (and the related SMPTE 305M), may be advantageously utilized to transport relatively low bitrate information streams while preserving an ability to properly splice sub-streams.

Although various embodiments which incorporate the teachings of the present invention have been shown and described in detail herein, those skilled in the art can readily devise many other varied embodiments that still incorporate these teachings.

What is claimed is:

1. A method for concatenating first and second transport streams to produce a spliced transport stream, comprising the steps of:

determining, for said first transport stream, a target out-frame representing a last frame of said first transport stream to be included in said spliced transport stream;

determining, for said second transport stream, a target in-frame representing a first frame of said second transport stream to be included in said spliced transport stream;

decoding a first portion of said first transport stream including said target out-frame;

decoding a first portion of said second transport stream including said target in-frame;

encoding said decoded portions of said first and second transport streams to produce a transition transport stream; and concatenating, in the order named, said first portion of said first transport stream, said transition transport stream and a second portion of said second transport stream.

2. The method of claim 1, wherein first portion of said first transport stream to be decoded is determined according to the steps of:

decoding, in display order, said out-frame and all preceding frames from said out-frame to a prior I-frame;

in the case of said out-frame comprising a B-frame, defining the frame immediately preceding said prior I-frame in transmission order as a final first transport stream frame in said transition stream;

in the case of said out-frame not comprising a B-frame, defining said out-frame as said final first transport stream frame in said transition stream.

3. The method of claim 1, wherein said first portion of said second transport stream to be decoded is determined according to the steps of:

decoding, in display order, said in-frame and all non-I-frames following said in-frame up to a next I-frame.

4. The method of claim 1, further comprising the step of indexing each of said first and second transport streams, said step of indexing comprising the steps of:

parsing a transport layer of a stream to be indexed to identify packets associated with at least one of sequence headers, picture headers and predefined splicing syntax;

determining, for each frame in said stream to be indexed, at least one of a picture number, a picture coding type, a start of frame transport packet number, an end of frame transport packet number, a presentation time stamp (PTS) and a decode time stamp (DTS).

5. The method of claim 4, wherein said determinations for each frame are stored in a meta file for subsequent use in generating a transition stream.

6. In a system for processing video information streams comprising I-frames and one or both of P-frames and B-frames arranged according to a group of pictures (GOP) information structure, a method for generating a transition stream, said transition stream being suitable for use in concatenating a from-stream and a to-stream, said transition stream comprising the steps of::

decoding a portion of said from-stream prior to an exit frame;

decoding a portion of said to-stream beginning at an entry frame; and re-encoding said decoded from-stream and to-stream portions to form said transition stream.

7. The method of claim 6, wherein said portion of said from-stream to be decoded is determined according to the steps of:

decoding, in display order, said exit frame and all preceding frames from said exit frame to a prior I-frame;

in the case of said exit frame comprising a B-frame, defining the frame immediately preceding said prior I-frame in transmission order as a last from-stream frame in said transition stream;

in the case of said exit frame not comprising a B-frame, defining said exit frame as said last from-stream frame in said transition stream.

8. The method of claim 6, wherein said portion of said to-stream to be decoded is determined according to the steps of:

decoding, in display order, said entry frame and all non-I-frames following said entry frame up to a next I-frame.

9. The method of claim 6, further comprising the step of indexing each of said from-stream and said to-stream, said step of indexing comprising the steps of:

parsing a transport layer of a stream to be indexed to identify packets associated with at least one of sequence headers, picture headers and predefined splicing syntax;

determining, for each frame in said stream to be indexed, at least one of a picture number, a picture coding type, a start of frame transport packet number, an end of frame transport packet number, a presentation time stamp (PTS) and a decode time stamp (DTS).

10. The method of claim 9, wherein said determinations for each frame are stored in a meta file for subsequent use in generating a transition stream.

11. The method of claim 6, wherein said from-stream and said to-stream each comprise a transport stream having associated with it a respective video buffering verifier (VBV) parameter, said method further comprising the step of:

determining if a difference exists between said from-stream VBV parameter and said to-stream VBV parameter; and adapting, in response to said determination, step of re-encoding.

12. The method of claim 11, wherein said step of adapting comprises the steps of:

increasing a rate control bit allocation in response to a determination that said from-stream VBV parameter exceeds said to-stream VBV parameter by a first threshold level; and decreasing said rate control bit allocation in response to a determination that said to-stream VBV parameter exceeds said from-stream VBV parameter by a second threshold level.

13. In a television studio, apparatus for splicing transport streams including video information, comprising:

a first decoder, for decoding a final portion of a from-stream prior to an exit frame;

a second decoder, for decoding an initial portion of a to-stream beginning at an entry frame; and an encoder, for re-encoding said decoded from-stream and to-stream portions to form a transition stream.

14. The apparatus of claim 13, further comprising:

a multiplexer, for concatenating in the order named, an initial portion of said from-stream, said transition stream and a final portion of said to-stream.

15. The apparatus of claim 13, further comprising:

an indexer, for parsing a transport layer of a stream to identify transport packets associated with at least one of sequence headers, picture headers and predefined splicing syntax, and for determining, for each frame in said stream to be indexed, at least one of a picture number, a picture coding type, a start of frame transport packet number, an end of frame transport packet number, a presentation time stamp (PTS) and a decode time stamp (DTS).

16. The apparatus of claim 15, further comprising:

a controller, operatively coupled to said indexer, for causing said indexer to process each of said from-stream and said to-stream and for utilizing said identified transport layer and frame information to define said initial and final portions of said from-stream and said-to-stream.

17. The apparatus of claim 16, wherein each of said from-stream and said to-stream are associated with a respective video buffering verifier (VBV) parameter, and wherein:

said controller determines if a difference exists between said from-stream VBV parameter and said to-stream VBV parameter and responsively adapts the operation of said encoder.

18. The apparatus of claim 17, wherein said controller adapts the operation of said encoder by increasing a rate control bit allocation in response to a determination that said from-stream VBV parameter exceeds said to-stream VBV parameter by a first threshold level, or by decreasing said rate control bit allocation in response to a determination that said to stream VBV parameter exceeds said from-stream VBV parameter by a second threshold level.

* * * * *